SELF-PROTECTING COAXIAL LINE DRIVER

Filed Feb. 14, 1963

INVENTOR.
Virgil R. Tindall,
BY
K. H. Fosche
Att'ys.

3,160,767

SELF-PROTECTING COAXIAL LINE DRIVER

Virgil R. Tindall, Cranfills Gap, Tex., assignor, by mesne assignments, to the United States of America as represented by the Secretary of the Navy Filed Feb. 14, 1963, Ser. No. 258,972
9 Claims. (Cl. 307—88.5)

This invention relates to a self-protecting coaxial line driver circuit and more particularly to a complementary pair of transistor line driver amplifiers for driving a 93 ohm alternating current terminated coaxial line to protect the transistor drivers against destruction or damage upon any short circuits occurring in the coaxial line.

One well-known line driver circuit utilizes a complementary pair of transistors for driving a 93 ohm alternating current (A.C.) terminated coaxial line for a computer circuit which has performed very satisfactorily except that, upon the occurrence of a short circuit in the coaxial line or the load connected thereto, the resulting high current usually destroys or damages the complementary pair of transistors rendering the driver circuit useless. It is highly desirable to retain this line driver with substantially the same characteristics under normal operation but which will protect itself when a short circuit is placed upon the output.

Accordingly, the present invention provides a circuit utilizing one additional transistor coupled to a complementary pair of driver transistors for a coaxial line to protect these driver transistors from overloaded currents whenever a short circuit occurs in the output coaxial line circuit. The complementary pair of driver transistors have their emitters coupled through a low impedance network across which the base and emitter of the protective transistor is coupled. The collector of the protective transistor is coupled to the common base circuit of the complementary pair of driver transistors to bypass the high currents caused by a short circuit in the coaxial line and to cause the complementary pair of driver transistors to be cut off during the short circuit period. It is accordingly an object of this invention to provide a complementary pair of transistor driver amplifiers of an A.C. terminated coaxial line with a protective network for protecting the complementary pair of line driver transistors from overload currents without destroying the normal operating characteristics of the complementary pair.

These and other objects and the attendant advantages, features, and uses of this invention will become more apparent to those skilled in the art as the description proceeds with reference to the accompanying drawing, in which.

Figure 1:
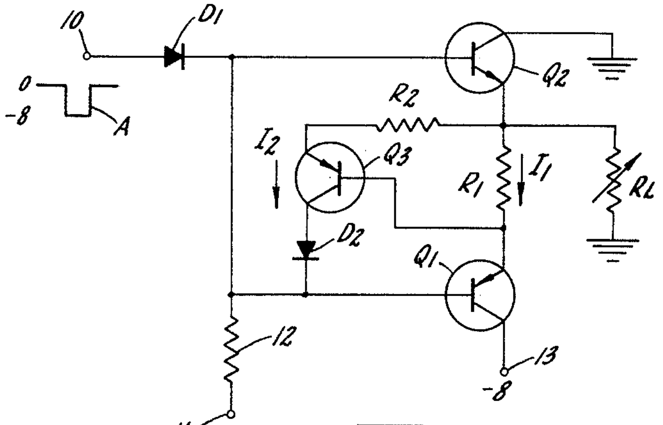
FIGURE 1 is a simplified circuit of a complementary pair of transistor line drivers incorporating the protective circuit of this invention.

Referring more particularly to FIGURE 1, a coaxial line driver circuit is shown for driving a load $R_L$ which may vary in accordance with load demand. The intelligence signals for driving the load $R_L$ are applied to a terminal 10 through a diode D1 in common to the base terminals of a complementary pair of transistor driver amplifiers Q1 and Q2. By way of illustration, the input intelligence signals may be of a waveform as shown by A which may be negative pulses in amplitude of about 8 volts. The common base coupling of transistors Q1 and Q2 is biased from a negative voltage source at terminal 11 through a biasing resistor 12 but the common base voltage is clamped to zero potential by the diode D1 in the absence of intelligence signals A. The negative voltage applied at terminal 11 is illustrated herein, for the purpose of example, as being a −28 volts. The complementary pair of transistors Q1 and Q2 have their emitters coupled through a resistance $R_1$, the transistor Q1 in this illustration being of a P-N-P type while the transistor Q2 is of a N-P-N type. The collector of transistor Q2 is coupled to a fixed potential, such as ground, while the collector of transistor Q1 is coupled at terminal point 13 to a negative voltage source which, for the purpose of illustration and example herein, is shown to be −8 volts. It may be seen of the circuit described thus far that during the transmission of the pulse A to the load $R_L$, if a short circuit should occur on the output $R_L$, or if $R_L$ should be varied to couple the output directly to ground, $I_1$ would immediately go to its maximum which includes transistor Q1, and this high current may be enough to destroy this transistor. A protective P-N-P type transistor Q3 has its emitter coupled through a resistor $R_2$ to the emitter of transistor Q2 which is likewise coupled to the load $R_L$ since the load $R_L$ is coupled to the emitter of transistor Q2. The base of the protective transistor Q3 is coupled to the emitter of transistor Q1 which, in effect, places the emitter and base of protective transistor Q3 in parallel with resistor $R_1$. The collector of the protective transistor Q3 is coupled through a diode D2 to the common base coupling of transistors Q1 and Q2. Whenever a short circuit occurs in the output circuit $R_L$ during the transmission of a pulse A, the tendency of the current $I_1$ to go its maximum will produce a voltage drop across resistor $R_1$ causing a drop in base voltage of transistor Q3 to render this protective transistor Q3 conductive to bypass the high current $I_1$ away from transistor Q1. At the same time the high current $I_2$ through the protective transistor Q3 will sufficiently raise the base voltage of transistors Q1 and Q2 to cut transistor Q1 off.

Figures 2, 3:
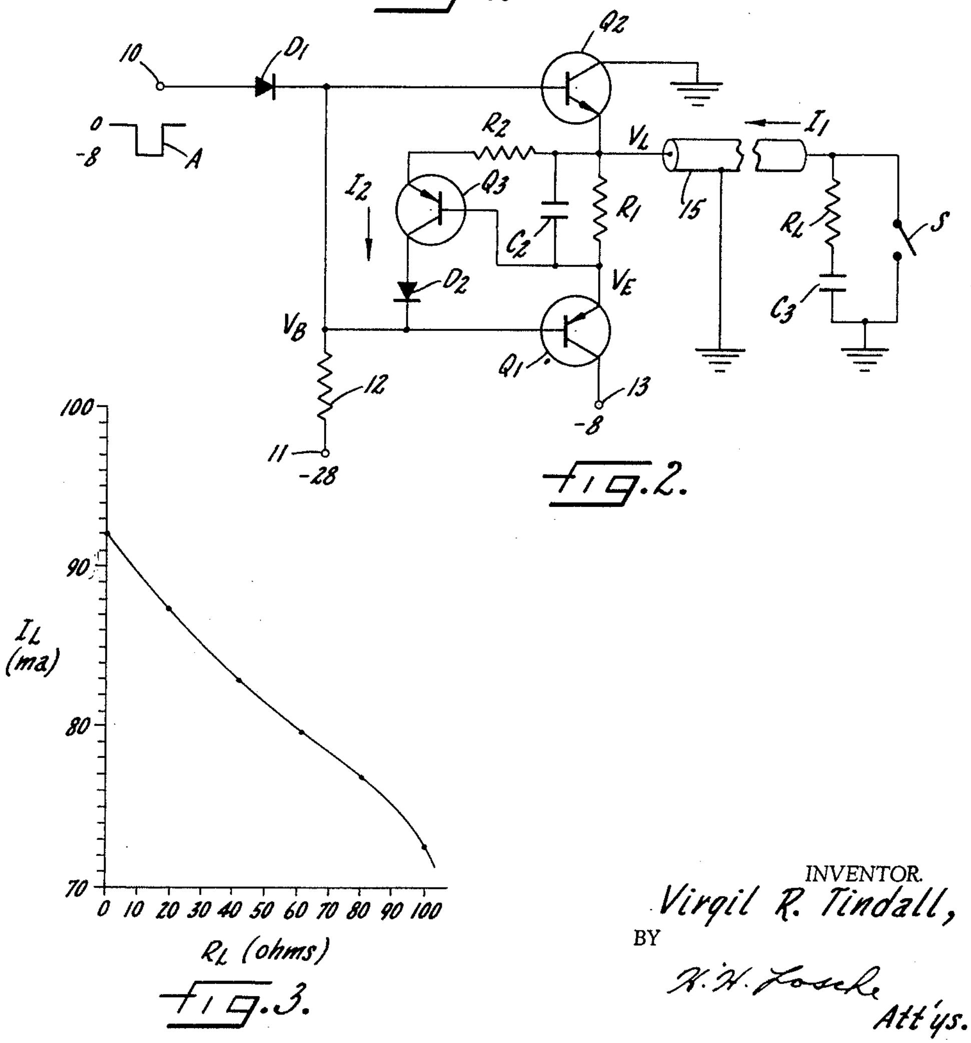
FIGURE 2 is a more sophisticated and practical circuit of the self-protecting line driver.
FIGURE 3 is a graph of a current and resistance relation of the coaxial line.

Referring more particularly to FIGURE 2, a more practical circuit is shown for an A.C. terminated coaxial line 15, like parts with those parts in FIGURE 1 being designated by like reference characters. In this Figure the coaxial line 15 is coupled to the emitter of transistor Q2 as in FIGURE 1, the output terminated load being through a load represented by the resistor $R_L$ and a capacitor C3 in series to ground or fixed potential. A switch S is placed in parallel with the load $R_L$ and C3 merely for the purpose of illustrating a short circuit to the coaxial line 15. In addition, a capacitor C2 couples the emitters of transistors Q1 and Q2 in parallel with the resistance $R_1$. The diode D1 is used to clamp the common base voltage of transistors Q1 and Q2 to zero potential in the absence of the application of intelligence signals A. The diode D2 is used to prevent the charging of capacitor C2 with input current through the collector-base diode of the protective transistor Q3 when the input voltage is switched to ground potential. For the purpose of example in giving an operative description of the invention but not to in any way limit the invention by these values, let it be assumed that the itemized elements have the following values applied thereto:

| | |
|---|---|
| Resistors: | |
| $R_L$ | 91 ohms. |
| $R_1$ | 5 ohms. |
| $R_2$ | 30 ohms. |
| 12 | 4,700 ohms. |
| Capacitors: | |
| C2 | 4.7 microfarads ($\mu$f.) |
| C3 | .033 $\mu$f. |
| Diodes: | |
| D1 | 1N277. |
| D2 | 1N277. |
| Transistors: | |
| Q1 | 2N428. |
| Q2 | 2N388. |
| Q3 | 2N1303. |

*Operation*

In the operation of the device shown in FIGURE 2 let it be assumed that no signal A is applied at present at which time the base voltage of transistors Q1 and Q2 is held at substantially zero potential. If the capacitors C2 and C3 are holding no charge, the emitter voltage will likewise have substantially zero potential and transistors Q1 and Q2 will be quiescent. If there is some negative charge in either capacitor C2 or C3 sufficient to overcome the threshold voltage of transistors Q1 and Q2, there may be a slight current draw from ground through the collector of transistor Q2, through the emitter thereof, through $R_1$, and through the emitter-collector of transistor Q1 to the negative voltage terminal 13 although this current will be negligible and immaterial to the operation of the circuit upon the application of an intelligence signal such as A. The −8 volt pulse will be applied simultaneously to the bases of transistors Q1 and Q2 turning transistor Q1 "on" and Q2 "off." Since transistor Q1 is of the P-N-P type, it will be forward-biased while transistor Q2, being of the N-P-N type, will be back-biased. Since capacitor C3 is much smaller than C2, the load impedance will increase at a faster rate than the impedance of the $R_1$C2 combination. If the combination of $R_1$C2 offers a sufficiently low impedance, only a small amount of base current will flow in the protective transistor Q3 and the current $I_2$ through this transistor Q3 will be negligible. Consequently, the voltage across the base of transistor Q3 and the current $I_2$ will thus remain small as long as the driver transistors Q1 and Q2 are operative under a negative intelligence pulse A.

When the −8 volt pulse A at the input 10 falls back to zero, transistor Q1 will be cut off and the output voltage $V_L$ will decrease toward zero. The capacitor C3 and the capacitance of the coaxial line 15, which would prevent the output voltage from immediately decreasing to zero, are discharged through the low resistance of the "on" transistor Q2; since this transistor will be forward biased for any negative voltage at its emitter with respect to its base. The diode D2 will prevent charge of the capacitor C2 or C3 with input current through the collector-base diode of the transistor Q3 during the period that the −8 volt signal A returns to zero potential. The output circuit through the coaxial line 15 to the load $R_L$ accordingly becomes inactive until the next or subsequent signal A appears at the input 10.

Let it be assumed that upon the next occurrence of the input signal A at terminal 10 the switch S is closed representing a grounded output circuit. The grounded output circuit through switch S will tend to raise the output current $I_1$ to a maximum from ground through switch S, the coaxial line 15, the capacitor C2 and resistance $R_1$ network, and the transistor Q1 to the −8 volt source. This attempt to establish a high current $I_1$ through the transistor Q1 will produce an immediate voltage drop on the base of transistor Q3 which will place this transistor in conduction to bypass the current $I_1$ through transistor Q3 as current $I_2$. This immediately raises the common base voltage on transistors Q1 and Q2 immediately turning these transistors "off" and thereby protecting these transistors against maximum current damage by reason of a short in the load circuit. Transistor Q3 would be conductive for every condition of short circuit as illustrated by switch S in its closed position as long as the short exists. Whenever the short is removed, the transistor Q3 would be cut off because of the low current $I_1$ demanded by the load $R_L$.

Referring more particularly to FIGURE 3, the load current is illustrated in graph form with respect to the load resistance showing that when a short occurs in the output, as by closing switch S at which time the load resistance is zero, the load current would be at its maximum or approximately 93 milliamperes. This load current $I_1$ drops rapidly with the increase of load resistance $R_L$.

The operation of the circuit shown in FIGURE 2 may also be expressed by mathematical formula for the short circuit states of this circuit. When the protective transistor Q3 conducts, $I_2$ increases and the base of Q1 and Q2 becomes clamped to a voltage of:

$$V_B = V_L - I_2R_2 - V_{D2} - V_{EC3} \quad (1)$$

where $V_{D2}$ is a voltage drop across the diode D2, and $V_{EC3}$ is the voltage across the emitter and collector of transistor Q3. The emitter voltage of transistor Q1 is:

$$V_E = V_L - I_1R_2 \text{ (if we assume } I_1 \text{ greater than } I_2) \quad (2)$$

Since Q3 is saturated, the drop across it is negligible with respect to other terms in Equation 1, and the base voltage with respect to the emitter voltage of Q1 may be written $$V_{BE} = V_L - R_2I_2 - V_{D2} - V_L + I_1R_1 \quad (3)$$

or $$V_{BE} = I_1R_1 - I_2R_2 - V_{D2} \quad (4)$$

if $$I_1R_1 \text{ is equal to or greater than } R_2I_2 + V_{D2} \quad (5)$$

then $$V_{BE} \text{ is equal to or greater than } 0 \quad (6)$$

It may then be readily seen that transistor Q1 will be turned off and the current $I_1$ will be limited to some value depending upon the choice of $R_1$ and $R_2$. In this manner the transistors Q1 and Q2 will always be protected against short circuits in the output and, in the absence of any short circuits in the output, this complementary pair of transistors Q1 and Q2 will function and operate with their normal characteristics as though the protective circuit through the transistor Q3 were not present.

While many modifications and changes may be made in the constructional details and features of this invention or the protective circuit applied to similar driver transistor circuits without departing from this invention, it is to be understood that I desire to be limited only by the scope of the appended claims. It is further to be understood that the types of transistors used may be changed to change the circuit for different polarity signals and different polarity voltage supplies and that the values of the various capacitors and resistors may be changed to meet different applications without departing from the spirit and scope of this invention.

I claim:

1. Self-protecting impedance conductor driver circuit comprising:

an impedance conductor for conducting intelligence signals from an input to a point of use;

a pair of current carrier emission means having a control electrode and two conduction electrodes with the control electrodes coupled in common to said input and with the conduction electrodes coupled in complement across a voltage source with an impedance in between said pair of current carrier emission means, one of the conduction electrodes of said pair of current carrier emission means being coupled to said impedance conductor;

a protective circuit including a third current carrier emission means having a control electrode and two conduction electrodes with one conduction electrode and said control electrode coupled across said impedance and the other conduction electrode coupling the common control electrode coupling of said pair of current carrier emission means whereby high current drain in said impedance conductor activates said third current carrier emission means into conduction to prevent high current conduction in either of said pair of current carrier emission means.

2. A self-protecting coaxial line driver circuit comprising:

a coaxial line for conducting intelligence signals from an input to a point of use;

a pair of semiconductor devices each having one control electrode and two conduction electrodes with the control electrodes thereof coupled in common to said input and to a biasing source and with the conduction electrodes thereof coupled through an impedance network therebetween to a voltage source, the conduction electrode of one of said pair of semiconductors being coupled to said coaxial line; and a third semiconductor device having one control electrode and two conduction electrodes with one conduction electrode coupled through a resistance to said coaxial line being one end of said impedance network, said control electrode coupled to the other end of said impedance network, and the other conduction electrode coupled to the common coupling of said pair of semiconductor devices whereby intelligence signals from said input are driven by said pair of semiconductor devices through said coaxial line and, upon line short, said third semiconductor device will be activated into conductivity to conduct high currents therethrough bypassing said pair of semiconductor devices.

3. A self-protecting coaxial line driver circuit as set forth in claim 2 wherein said pair and third semiconductor devices are transistors with the bases constituting said control electrodes and said conduction electrodes being the emitters and collectors thereof with the emitters of said pair of transistors being coupled to opposite ends of said impedance network.

4. A self-protecting coaxial line driver circuit as set forth in claim 3 wherein said third transistor has said emitter constituting said one conduction electrode and said collector constituting said other conduction electrode.

5. A self-protecting coaxial line driver circuit as set forth in claim 4 wherein one transistors of said pair of transistor having its emitter coupled to said coaxial line is collector grounded and the other transistor of said pair of transistors has a negative potential coupled to the collector thereof.

6. A self-protecting coaxial line driver circuit comprising:

a coaxial line for conducting intelligence signals from an input to a point of use;

a pair of transistors each having a base, an emitter, and a collector, said pair being coupled in complement across a voltage source with a first resistor and a first capacitor coupled in parallel between the emitters thereof, with the emitter of one coupled to said coaxial line, and with the bases thereof coupled in common to said input through a first diode and to a voltage biasing source; and a protective circuit including a third transistor having an emitter and base coupled in parallel with said parallel coupling of said first resistor and first capacitor, the emitter coupling being through a second resistor to said first resistor in common with said coaxial line coupling, and having a collector thereof coupled through a second diode to the common base coupling of said pair of transistors whereby intelligence signals applied to said input are conducted over said coaxial line by the drive of said pair of transistors in complement and, upon a short circuit on said coaxial line, said third transistor base will be biased to produce third transistor conduction bypassing said transistor pair and rendering same nonconductive for protection against high currents.

7. A self-protecting coaxial line driver circuit as set forth in claim 6 wherein said one transistor of said pair is an N-P-N type and the other transistor of said pair and said third transistor are of P-N-P type, said voltage source and said voltage biasing source are negative voltages, said first diode is oriented with its cathode coupled to said common base coupling of said pair of transistors, and said second diode is oriented with its anode coupled to the collector of said third transistor whereby said biasing voltage on the bases of said pair of transistors is subject to change by voltage conducted through the emitter and collector circuit of said third transistor.

8. A self-protecting coaxial line driver circuit as set forth in claim 7 wherein said coaxial line includes capacitance smaller than the capacitance of said first capacitor whereby the load impedance in said coaxial line will increase faster than the impedance of said parallel coupling of said first resistor and first capacitor.

9. A self-protecting coaxial line driver circuit as set forth in claim 8 wherein said first resistance is of lower resistance than the resistance of said second resistor.

No references cited.

JOHN W. HUCKERT, *Primary Examiner.*

ARTHUR GAUSS, *Examiner.*

UNITED STATES PATENT OFFICE

CERTIFICATE OF CORRECTION

Patent No. 3,160,767 December 8, 1964

Virgil R. Tindall

It is hereby certified that error appears in the above numbered patent requiring correction and that the said Letters Patent should read as corrected below.

Column 4, equation (2) should appear as shown below instead of as in the patent:

$$V_E=V_L-I_1R_1 \text{ (if we assume } I_1 \text{ greater than } I_2\text{)}$$

column 5, line 55, for "one transistors of said pair of transistor" read -- one transistor of said pair of transistors --.

Signed and sealed this 27th day of April 1965.

(SEAL)
Attest:

ERNEST W. SWIDER
Attesting Officer

EDWARD J. BRENNER
Commissioner of Patents